(12) United States Patent
Ivanchikov

(10) Patent No.: US 8,301,122 B2
(45) Date of Patent: Oct. 30, 2012

(54) METHOD OF EXCHANGING VOICE MESSAGES BETWEEN THE DRIVER AND USER OF THE VEHICLE

(76) Inventor: Aleksey Anatolyevich Ivanchikov, Gomel (BY)

( * ) Notice: Subject to any disclaimer, the term of this patent is extended or adjusted under 35 U.S.C. 154(b) by 12 days.

(21) Appl. No.: 12/998,137

(22) PCT Filed: Sep. 18, 2009

(86) PCT No.: PCT/EA2009/000006
§ 371 (c)(1),
(2), (4) Date: Mar. 18, 2011

(87) PCT Pub. No.: WO2010/034316
PCT Pub. Date: Apr. 1, 2010

(65) Prior Publication Data
US 2011/0171950 A1    Jul. 14, 2011

(30) Foreign Application Priority Data
Sep. 26, 2008  (EA) .................................. 200802269

(51) Int. Cl.
*H04M 11/10*   (2006.01)
(52) U.S. Cl. .................. 455/413; 455/412.1; 455/412.2; 455/414.3; 455/415; 455/404.2; 455/440; 455/456.1; 455/456.2
(58) Field of Classification Search ................ 455/404.2, 455/413, 412.2, 412.1
See application file for complete search history.

(56) References Cited

U.S. PATENT DOCUMENTS

| 7,389,244 B2 * | 6/2008 | Kaplan | 705/1.1 |
| 2004/0076280 A1 * | 4/2004 | Ando et al. | 379/220.01 |

* cited by examiner

*Primary Examiner* — Olumide T Ajibade Akonai
*Assistant Examiner* — Randy Peaches
(74) *Attorney, Agent, or Firm* — Francis C. Hand; Carella, Byrne, et al.

(57) ABSTRACT

The invention relates to means of communication between drivers and vehicle users, namely, to establishing connection between drivers and users going in the same direction.
The objective of the invention is to establish a voice connection between the driver and vehicle user, taking into account their relative position, relative routes, as well as other reasons for the driver and the user to share additional information with the aim of jointly going along the route.
The goal is reached in the following way: the driver's coordinates are registered, messages from users are received; together with receiving and recording the user's message the coordinates of the user are recorded; the driver individually receives messages from the list prepared for them, with the list of messages broadcasted to the driver being formed using the driver and the user's location coordinates and the voice communication is established between the driver and the user selected by the driver from the broadcast list. There are other differences from the prototype. The method allows receiving, storing and sending voice messages based on an individual list. The method allows to automatically establish a selective connection between the driver and the user, located within the reach area. The method saves both the user's and the driver's time, also it reduces the costs of transportation for the users.

9 Claims, No Drawings

METHOD OF EXCHANGING VOICE MESSAGES BETWEEN THE DRIVER AND USER OF THE VEHICLE

The invention relates to means of communication between drivers and vehicle users, namely, to establish connection between drivers and users going in the same direction.

There are well-known systems for acquisition and transmittal of information about vehicles which consist of GPS-modules installed in vehicles, control unit, memory units containing vehicle information, messages input/output system for receiving and transmitting data from/to the dispatching station. These known systems contain a messages input/output unit, a database and a displaying facility [1, 2, 3].

One of the drawbacks of the methods and systems currently in use is the necessity to work with dispatch operators. Any order goes to dispatcher operator first. The dispatcher processes orders in a certain way and directs them to drivers. The dispatcher also tracks the status of the order and acts as an intermediary between drivers and users.

Another known system of vehicle management and control which has a special unit installed in all vehicles. This unit contains message generating module to which a GPS receiver, a time counter and a status code generating module are connected. The generating module output is connected to transmitter-receiver unit of the dispatching station in which the transmitter-receiver is located which is connected to data memory through parameter selection module. The data memory stores the current data on parameters of the vehicles which are currently active. In this system there is a feature for blocking the voice connection between dispatcher operator and drivers.

Another disadvantage of the known system and method is the presence of the intermediary—the dispatching station which considerably increases the time needed to connect the driver and the user.

The most similar to the deposited technical solution is the method for sending ads based on the location of the user of the services and goods being advertised and the implementation of the method. [5].

The method currently in use includes registering users and advertisers in the automated system for sending advertisements, defining the classification criteria, preparing information for advertisements with parameters of their presentation, supplying advertisement information, transferring and presentation of the advertisement materials selected from the stored advertisement information to the user of a mobile device when the request is being transmitted for connection with the called party mobile device. In this request the current location of the mobile device user is identified and a relevant advertisement message with the classification parameters of the mobile device user with regard to the user's current location is generated. The aforementioned message is transmitted to message distribution control unit. In response to receiving this message a set of commercials is generated in order to be transferred to a specific user. The set includes at least one commercial generated with regard to this user's classification parameters and the current location of the mobile device.

The method currently in use allows to automatically define the location of the caller and automatically connect them to the server which distributes the advertisements with the distribution list being generated taking into account the user's location.

The disadvantage of this method is the use non-voice commercials only. There is no voice connection established with the user.

The objective of the present invention is the collection, processing and transmission of voice messages from users in need of transportation services and giving the possibility of establishing a voice connection, taking into account the location of the driver and the vehicle user to share more information with the aim of going along the route together.

The objective is reached by the method of exchanging voice messages between drivers and users of the vehicles by means of mobile networks which includes receiving voice messages from users, storing these messages and their transmission to the driver as well as establishing voice connection between the driver and the user according to as consistent with the invention the driver's coordinates are registered, messages from users are received, moreover, together with receiving and recording the user's message the coordinates of the user are recorded; the driver individually receives messages from the list prepared for them, with the list of messages broadcasted to the driver being formed using the driver and the user's location coordinates and the voice communication is established between the driver and the user selected by the driver from the broadcast list.

The objective is also reached by the fact that the list of messages broadcast to the driver is formed at the time when the messages are being received by the driver, after the message reception ends the list is deleted.

The objective is also reached by the fact that the user can delete their message at any time.

The objective is also reached by the fact that the user's message is deleted if the user changes their location or after a certain amount of time is passed.

The objective is also reached by the fact that user's and/or driver's location is defined using the satellite navigation technology.

The objective is also reached by the fact that user's and/or driver's location is defined using mobile network location technologies.

The objective is also reached by the fact that user's and/or driver's location is defined using the map with the message being sent via Internet.

The objective is also reached by the fact that that user's and/or driver's location is defined periodically at a predetermined time interval.

The objective is also reached by the fact that reach area is identified with due account for the driver's direction of travel.

The objective is also reached by the fact that the travel route is being predicted using the historical data of the driver's route and/or taking into account the road map.

The objective is also reached by the fact that messages with advance route requests are received from users.

Such implementation of Invention allows to swiftly and automatically establish voice connection of the driver and users going in the same direction and being in the area of mutual reach.

The method is implemented in the following way:

Service Provider allocates two special mobile communication numbers: one for registering users' messages, the second to send messages to drivers. The service participant is a subscriber of a mobile network operator, who calls one of these numbers. As the service requires information about the user's and the driver location their consent to location defining should be obtained. When addressing the service for the first time user listens to a confidentiality agreement and agrees to the registration and use of data on their location within the service. User calls the number for users allocated by the mobile network operator. User's location is identified together with the reception of voice message and gets into a database of voice messages. along with the voice message the data on user's location and phone number is stored in the database. All user messages are stored along with other attributes, by the time a particular trip is no longer needed. The service may include verification of the location at specified time intervals.

Relevance and of each user's messages can be tracked based on obsolescence (with regard to time passed), on the user's moving away from their original location by a specified distance. The message can also be canceled by the user by making commands during the conversation with the driver, or sending messages, or a call. There are also other known methods for cancelling messages (requests).

The driver calls the number allocated for the drivers by the mobile network operator, and listens to voice messages received from users who are within the reach area selected for him individually and broadcasted one by one (hereafter individual the list of broadcast). Driver's location can be defined both once at the time of the call, and at specified intervals, until he is listening to the list of broadcast, prepared for them by the service. Periodic determination of the location is necessary to predict the route and adjust the list of broadcast. Reach area can be defined by the service provider, based on the relevant position of the driver and the user. In the simplest case it is a circle of given radius, outlined round the current driver's position. In addition, the direction of the driver can be taken into account. It is calculated as the vector of the direction based on the last two points of the driver's position, as well as historical data about the routes of a particular driver and the automobile road map.

In this case, the reach area moves relative to the current position of the driver along the predicted route of driver's.

For intercity travels the reach area can have a larger radius than for short-distance trips. The size of the zone can be set by each driver individually. Individual broadcast list is prepared by the mobile network operator with the appropriate equipment and using software. The broadcast list consists of messages left by users located in the reach area of the driver for which the list was prepared.

Any user message is stored in the broadcast list until its expiration or cancellation. The messages by the users which are at the given moment in the reach area are added to the broadcast list. Priority order by which the messages are played might be chronological or random or based on the proximity of the user's location in relation to the driver who called. After the message is heard by the driver it is marked as transmitted. Obsolete messages are removed from the broadcast list or marked as obsolete if they were already heard by the driver and if they are played again by the driver they are marked by a corresponding audio signal. While the driver is listening to the individual broadcast list, he selects a particular user, in accordance with their routes of movement, personal preferences, etc.

The service provides drivers with an ability to navigate through users' messages from the broadcast list, immediate establishing of connection between the driver and the user for voice communication. These functions can be implemented using cell phone navigation buttons.

For users' convenience, their travel requests can also be posted via the Internet. In this case when submitting requests maps widely known on the Internet are used to specify the location. These can be YandexMap, GoogleEarth or other available maps. This method allows users and drivers to specify their location more precisely, as well as to submit and listen to messages with a delayed start time of broadcast, saving money in such a way. This method is more convenient for planned trips. Unlike traditional systems, with the dispatcher, or formalized input of user requests using the destination directory, the elimination of the unsuitable users and selection of travel companions is done in several stages as follows: The first stage involves an automated selection of users in the reach area, as described above. An individual broadcast list is generated for each driver is formed, consisting of a sequence of voice messages left by selected users. Further choice of users from the pre-selected list, is done by each driver, while listening to their own individual broadcast lists. While selecting, the driver takes into account their and users' relative routes, users' personal qualities, as well as any other criteria known to the driver alone.

The final decision on granting a specific user transport services is taken by the driver and the user together during a voice dialogue, initiated by the driver by means of the mobile connection immediately at any time while listening to the current message.

The method allows receiving, storing and sending voice messages based on an individual list. The method allows to automatically establish a selective connection between the driver and the user, located within the reach area. The method saves both the user's and the driver's time, also it reduces the costs of transportation for the users.

The applicant has prepared the documentation and tested elements of the method in trial operation.

Sources of information taken into account in the examination process:

1. International application WO98/11513, МПК G 07 C 5/00 published on 19 Mar. 1998.
2. Patent РФ 2113013, МПК G 08 G 1/01, published on 10 Jun. 1998.
3. Patent РФ 2143745 МПК G 08 C 19/12, published on 27 Nov. 1999.
4. Patent РФ 2173885, МПК G 07 C 5/00, published on 20 Sep. 2001.
5. Application РФ 2007107484, МПК H04Q 7/00 published. 10 Sep. 2008—proto-type.

The invention claimed is:

1. A method of exchanging voice messages between drivers and users of the vehicles comprising the steps of
    allocating a first mobile communication number in a service provider for registering users' messages;
    allocating a second mobile communication number in said service provider for sending messages to drivers;
    receiving a call containing a voice message from each of a plurality of users at said first mobile communication number;
    placing each received voice message in a database of voice messages and establishing a location of each said user;
    thereafter receiving a call from a driver at said second mobile communication number and establishing a location of said driver;
    defining a reach area based on the relative location of said driver to the locations of said users and broadcasting the messages in said database corresponding to the locations of said users in said reach area to said driver; and
    establishing a voice connection between said driver and a driver-selected user from said users in said reach area.

2. A method as set forth in claim 1 wherein the messages in said database corresponding to the locations of said users in said reach area are broadcast to a driver as a broadcast list and said broadcast list is deleted after a predetermined time period.

3. A method as set forth in claim 1 wherein the messages in said database corresponding to the locations of said users in said reach area are broadcast to a driver as a broadcast list and said broadcast list is deleted after a driver-selected user is selected.

4. A method as set forth in claim 1 wherein said message of a user is deleted from said database in response to a request from a user.

5. A method as set forth in claim 1 wherein said message of a user is deleted from said database in response to a user changing location.

6. A method as set forth in claim 1 wherein said message of a user is deleted from said database in response to expiration of a predetermined time period.

7. A method as set forth in claim 1 wherein the location of said driver is re-established at periodic time intervals and said reach area is re-defined in response to each re-established location of said driver.

8. A method as set forth in claim 7 wherein said reach area is re-defined in dependence on the direction of travel of said driver.

9. A method of exchanging voice messages between drivers and users of the vehicles comprising the steps of allocating at least one communication number in a service provider for registering users' messages and for sending said messages to drivers;

receiving a call containing a voice message from each of a plurality of users at said communication number;

placing each received voice message in a database of voice messages and establishing a location of each said user;

thereafter receiving a call from a driver at said communication number and establishing a location of said driver:

defining a reach area based on the relative location of said driver to the locations of said users and broadcasting the messages in said database corresponding to the locations of said users in said reach area to said driver; and establishing a voice connection between said driver and a driver-selected user from said users in said reach area.

\* \* \* \* \*